United States Patent
Liu et al.

(10) Patent No.: US 10,266,733 B2
(45) Date of Patent: Apr. 23, 2019

(54) OPTICALLY CLEAR HOT MELT ADHESIVES AND USES THEREOF

(71) Applicants: HENKEL IP & HOLDING GMBH, Duesseldorf (DE); HENKEL AG & CO. KGAA, Duesseldorf (DE)

(72) Inventors: Yuxia Liu, Dayton, NJ (US); Charles W. Paul, Morristown, NJ (US); Peter D. Palasz, Maidenhead (GB)

(73) Assignees: HENKEL IP & HOLDING GMBH, Duesseldorf (DE); HENKEL AG & CO. KGAA, Duesseldorf (DE)

( * ) Notice: Subject to any disclaimer, the term of this patent is extended or adjusted under 35 U.S.C. 154(b) by 0 days.

(21) Appl. No.: 15/426,214

(22) Filed: Feb. 7, 2017

(65) Prior Publication Data

US 2017/0145267 A1    May 25, 2017

Related U.S. Application Data

(63) Continuation of application No. PCT/US2015/049646, filed on Sep. 11, 2015.
(Continued)

(51) Int. Cl.
   *C09J 153/02*    (2006.01)
   *B32B 7/06*    (2019.01)
   (Continued)

(52) U.S. Cl.
   CPC ............ *C09J 153/025* (2013.01); *B32B 7/06* (2013.01); *B32B 7/12* (2013.01); *B32B 27/08* (2013.01);
(Continued)

(58) Field of Classification Search
   CPC ...... C09J 153/005; C09J 153/025; C09J 5/00; C09J 2453/00; B32B 7/12; B32B 27/12;
   (Continued)

(56) References Cited

U.S. PATENT DOCUMENTS

| 4,035,549 A | 7/1977 | Kennar |
| 4,233,432 A | 11/1980 | Curtis, Jr. |

(Continued)

FOREIGN PATENT DOCUMENTS

| EP | 175562 A2 | 3/1986 |
| EP | 1182710 A1 | 2/2002 |

(Continued)

OTHER PUBLICATIONS

Eastotac Hydrocarbon Resins Brochure by the Eastman Company (Aug. 1992).
(Continued)

*Primary Examiner* — Ruiyun Zhang
(74) *Attorney, Agent, or Firm* — Sun Hee Lehmann

(57) ABSTRACT

Hot melt adhesives with pressure sensitive adhesive properties for electronic devices are described. The hot melt adhesive comprises a styrenic block copolymer with fully hydrogenated and saturated soft blocks, a liquid diluent or a tackifier, a (meth)acrylate monomer or an oligomer having at least two (meth)acrylic functionalities per oligomer chain, and an initiator. The hot melt adhesive is also a reworkable UV curable optically clear adhesive film. The adhesive and film are suitable as a laminating PSA film or encapsulant for LCD display, LED display, touch screen, and flexible thin film photovoltaic module.

16 Claims, 4 Drawing Sheets

Related U.S. Application Data

(60) Provisional application No. 62/035,654, filed on Aug. 11, 2014.

(51) Int. Cl.

| | | |
|---|---|---|
| *B32B 27/08* | (2006.01) | |
| *B32B 27/10* | (2006.01) | |
| *B32B 27/20* | (2006.01) | |
| *B32B 27/30* | (2006.01) | |
| *B32B 27/32* | (2006.01) | |
| *B32B 27/36* | (2006.01) | |
| *B32B 27/38* | (2006.01) | |
| *B32B 27/40* | (2006.01) | |
| *B32B 37/00* | (2006.01) | |
| *B32B 37/12* | (2006.01) | |
| *C09J 4/06* | (2006.01) | |
| *B32B 7/12* | (2006.01) | |
| *C09J 5/00* | (2006.01) | |
| *C08L 9/00* | (2006.01) | |

(52) U.S. Cl.
CPC ............ *B32B 27/10* (2013.01); *B32B 27/20* (2013.01); *B32B 27/30* (2013.01); *B32B 27/302* (2013.01); *B32B 27/308* (2013.01); *B32B 27/32* (2013.01); *B32B 27/36* (2013.01); *B32B 27/38* (2013.01); *B32B 27/40* (2013.01); *B32B 37/003* (2013.01); *B32B 37/12* (2013.01); *C08L 9/00* (2013.01); *C09J 4/06* (2013.01); *C09J 5/00* (2013.01); *B32B 2037/1253* (2013.01); *B32B 2037/1269* (2013.01); *B32B 2264/10* (2013.01); *B32B 2264/101* (2013.01); *B32B 2264/102* (2013.01); *B32B 2264/105* (2013.01); *B32B 2264/108* (2013.01); *B32B 2270/00* (2013.01); *B32B 2307/412* (2013.01); *B32B 2307/7244* (2013.01); *B32B 2307/7246* (2013.01); *B32B 2309/02* (2013.01); *B32B 2309/12* (2013.01); *B32B 2309/68* (2013.01); *B32B 2325/00* (2013.01); *B32B 2333/08* (2013.01); *B32B 2457/00* (2013.01); *B32B 2457/12* (2013.01); *B32B 2457/20* (2013.01); *B32B 2457/202* (2013.01); *B32B 2457/206* (2013.01); *B32B 2457/208* (2013.01); *C09J 2453/00* (2013.01); *Y02P 20/582* (2015.11)

(58) Field of Classification Search
CPC ..... B32B 27/302; B32B 27/308; B32B 37/12; B32B 2037/1253; B32B 2037/1269; B32B 2325/00; B32B 2457/12; B32B 2457/202; B32B 2457/206
USPC ........ 428/1.1, 1.5, 1.54, 1.55, 345; 257/100; 264/171.1
See application file for complete search history.

(56) References Cited

U.S. PATENT DOCUMENTS

| | | | |
|---|---|---|---|
| 5,171,628 | A | 12/1992 | Arvedson et al. |
| 5,171,760 | A | 12/1992 | Kaszas et al. |
| 5,256,717 | A | 10/1993 | Stauffer et al. |
| 5,262,468 | A | 11/1993 | Chen |
| 5,331,033 | A | 7/1994 | Stauffer et al. |
| 5,397,843 | A | 3/1995 | Lakshmanan et al. |
| 5,559,165 | A | 9/1996 | Paul |
| 5,665,823 | A | 9/1997 | Saxena et al. |
| 6,054,549 | A | 4/2000 | Bahadur et al. |
| 6,448,303 | B1 | 9/2002 | Paul |
| 6,521,825 | B2 | 2/2003 | Miura et al. |
| 6,706,779 | B2 | 3/2004 | Bahadur et al. |
| 6,818,819 | B2 | 11/2004 | Morizane et al. |
| 6,833,404 | B2 | 12/2004 | Quinn et al. |
| 2002/0128345 | A1 | 9/2002 | Paul |
| 2003/0124296 | A1 | 7/2003 | Smith |
| 2009/0026934 | A1* | 1/2009 | Fujita ..................... C09J 123/20 313/504 |
| 2011/0121356 | A1* | 5/2011 | Krawinkel .............. C03C 27/10 257/100 |
| 2012/0028303 | A1 | 2/2012 | Rueker et al. |

FOREIGN PATENT DOCUMENTS

| | | |
|---|---|---|
| EP | 2718385 B1 | 3/2015 |
| JP | 2012057065 A | 3/2012 |
| WO | 9709393 A1 | 3/1997 |
| WO | 2007039130 A1 | 4/2007 |
| WO | 2009148722 A2 | 12/2009 |
| WO | 2011037732 A2 | 3/2011 |
| WO | 2011062932 A1 | 5/2011 |
| WO | 2013165637 A1 | 11/2013 |
| WO | 2013173976 A1 | 11/2013 |
| WO | 2014029062 A1 | 2/2014 |

OTHER PUBLICATIONS

Specialty Polymers for Adhesives and Sealants by the Exxon Chemical Company (Oct. 1990).
Litz, R.J., Developments in Ethylene-Based Hot Melt Adhesives, Adhesives Age 17(8):35-38 (1974).
Clark, T., Bookbinding with Adhesives (3rd ed. McGraw-Hill, UK 1994), p. 1.
Alger, M.S., Polymer Science Dictionary (Elsevier Applied Science, New York 1989), p. 115.
Lee, S.M., Dictionary of Composite Materials Technology (CRC Press, Technology & Engineering 1995), p. 43.
Young, R.J. & Lovell, P.A., Introduction to Polymers (2nd ed., Chapman & Hall, New York 1991), pp. 10-11, 292.
Handbook of Adhesives (ed. Irving Skeist, Van Nostrand Reinhold Co. 1977), pp. 495-498.
Kraus et al., Tack and Viscoelasticity of Block Copolymer Based Adhesives, J. Adhesion 10:221-36 (1979).
Eastman Chemical Brochure titled "World of Eastman Chemicals" dated Jan. 1989, Publication No. P-160F.
Eastman AQ Branched Polyesters Brochure dated Sep. 1997, Publication No. WA-628.
Eastman Chemical Sales Brochure dated Feb. 1993, Publication No. WA-21.
Exxon Chemical Sales Brochure dated Mar. 1994.
Eastman Chemical Eastotac Hydrocarbon Resins dated Nov. 1994, Publication WA-3C.
Exxon Chemical Escorez Tackifiers Brochure dated Apr. 1992.
Liao, T.P. and Kennedy, J.P., Polymer Bulletin, vol. 6, 1981, pp. 135-141,.
Polymer Bulletin, vol. 25, p. 633 (1991), J.P. Kennedy.
Fouassier, J-P., Photoinitiation, Photopolymerization and Photocuring Fundamentals and Applications 1995, Hanswer/Gardner Publications, Inc., New York, NY.
Dean, J. Lang's Handbook of Chemistry, 1999, McGraw Hill, Inc., New York, NY, p. 11.5.
Gaudiana, Russell, "Organic Photovoltaics: Challenges and Opportunities," J. of Polymer Science: Part B: Polymer Physics 2012, DOI: 10.1002/polb,23083.

* cited by examiner

Sample F (left film)  Sample 4 (right film)

OPTICALLY CLEAR HOT MELT ADHESIVES AND USES THEREOF

FIELD OF THE INVENTION

The invention relates to hot melt adhesives with pressure sensitive adhesive (PSA) properties for electronic devices. The invention further relates to UV curable optically clear adhesive (UV OCA) films. The optically clear adhesive films are reworkable and/or removable during the assembly process of electronic devices. The adhesive and films are especially suitable as an encapsulant for LCD display, LED display, touch screen, and flexible thin film photovoltaic module.

BACKGROUND OF THE INVENTION

Electronic devices and circuits, in general, consist of an active layers or components of light emitting cells, charge transfer layers, inks, bus bars, etc., disposed between a substrate/back sheet (hereinafter interchangeably used) and a cover/front sheet (hereinafter interchangeably used), and the substrate and cover sheets are adhered together with an encapsulated adhesive or a laminated adhesive film that enhances light transmission and optical effects. One or both of the substrate and cover are made of optical transparent materials. The active layers and/or components in electronic devices are sometimes susceptible to degradation by moisture and oxygen. A laminating adhesive film can restrict the transmission of oxygen and water vapor, and protects the active layers from degradation.

The use of a laminating adhesive film and/or an encapsulant (hereinafter interchangeably used) in an electronic device improves manufacturing efficiency over a liquid adhesive. However, drawbacks associated with films include poor substrate wet-out and poor void filling during assembly process due to the viscoelasticity of the film. This problem is exacerbated for substrates that contain components such as, electrodes, bus bars, ink steps, integrated circuits, and the like, due to their irregular surfaces, increasing the likelihood of void formation. WO2009148722 and WO2011062932 disclose the use of high (typically greater than 300,000g/mol) weight average molecular weight (Mw) polyisobutylene-based adhesives. Such adhesives have high viscosity, and thus, are susceptible to voids or air bubbles in organic electronic devices. In order to obtain better wet out, more ink filling, less air bubbles/ voids, the uncured adhesive film is applied onto the substrate under hot lamination. However, many active organic and electronic components are sensitive to heat above 60° C., and prolonged exposure to heat results in detrimental effects on the polymer and components. JP2012057065 discloses non-curable adhesive with pressure sensitive adhesive properties. In order to properly wet-out the substrates and to minimize void formations, the viscosity of the adhesive film is kept below 1,000,000 cps or below 200,000 g/mol viscosity average molecular weight (Mv) at 120° C.; however, the uncured thermal plastic adhesive exhibits cold flow under strain during the lifetime of the device.

CN 103820042 discloses the use of SIS and SBS block copolymer to make a heat-curable hot melt adhesive for Thermal-melt Optical Clear Adhesive (TOCA). However, it is well known in the art that the unsaturated C=C functional bonds in the soft block of SIS and SBS block copolymer readily oxidizes in air under UV light or at elevated temperature, and the adhesive film will turn yellow or brown over time.

Optically clear adhesive films (LOCA, OCA or UV OCA) pose another reworkability issue to the assembly process for electronic devices, such as display panels, glass plates, touch panels, diffusers, rigid compensators, heaters, and flexible polarizers. WO201429062 describes the challenge of the reworking process when electronic devices are formed with UV curable liquid optically clear adhesive (LOCA). During the reworking process, the cover sheet and LCD panel are separated either by hand or wire cutting, the LOCA residue on both cover sheet and substrate is then removed and cleaned with an organic solvent. Organic solvent is typically used to remove the adhesive residue, and this presents environmental, health and safety concerns. If the reworking process is carried out after UV cure, the adhesive film is usually broken into many small solid pieces, and removing all of these pieces can be time-consuming.

WO2013173976A1 discloses another challenge for optical devices, which includes appearance of dark spots and patches on LCD panels, also known as "Mura." Mura describes a display effect of low-contrast, irregular pattern or region, which is usually caused by uneven screen uniformity or a localized stress. One source of Mura is from the optically clear adhesive. Any kind of stress, even at low levels, inside the display can cause Mura and it is not a repairable defect. The Mura can be minimized if the optically clear adhesive films have ~0% shrinkage after cure and form soft adhesive films.

U.S. Pat. Nos. 5,559,165 and 6,448,303 disclose hot melt pressure sensitive adhesives that function as hydrogels. They are soft (Shore OO<30) and leaves no oil residue upon removal from a hard substrate. Other similar hydrogel-like soft adhesives were obtained by crosslinking or curing after cooling, as is the case with an electron beam curable acrylic described in EP175562. Similarly, U.S. Pat. No. 5,262,468 describes the use of high viscosity rubbers (40,000 cp at 25wt % in toluene) to obtain gelatinous thermoplastic compositions, but these compositions generally lack adhesive grab and virtually no adhesion exists.

There is a need in the art for a curable optically clear pressure sensitive adhesive that can be used as laminating adhesive or encapsulant for electronic devices and allow for good substrate wet-out and reworkability. The current invention fulfills this need.

BRIEF SUMMARY OF THE INVENTION

The invention provides pressure sensitive adhesives and adhesive films suitable for sealing and adhering substrates, protecting active layers and components from moisture and oxygen, and enhancing light transmission and optical effects. The adhesives comprise a styrene block copolymer having a fully hydrogenated and saturated soft block, a liquid diluent and/or a tackifier, a (meth)acrylate monomer and/or an oligomer having at least two (met)acrylic functionalities per oligomer chain, and a radical initiator. The adhesives optionally comprise additional polymers or copolymers, waxes, antioxidants, and desiccant fillers. In some embodiments, the adhesives and films require no further cure, and in other embodiments, the adhesives and films require cure with radiation or heat.

The pressure sensitive adhesives and adhesive films have strong cohesive strength, high elongation, low elastic modulus, low hardness, and low curing shrinkage. The adhesive films have pressure sensitive properties and are soft enough to allow devices to maintain flexibility and creep resistance upon long term exposure to strain. These properties yield minimum "Mura", zero voids, and good wet out and ink step filling, an outstanding reworking process for display devices. The adhesive films can be easily removed during the reworking process by peeling off the cover or substrate sheet in one or a few pieces before or after cure, with essentially no residue on the substrates.

In one embodiment, the optically clear adhesives composition comprises (A) from about 0.5 to about 20 parts of a styrenic block copolymer having fully hydrogenated and saturated soft blocks; (B) about 0.5 to about 80 parts by weight of a liquid diluent, a tackifier or mixtures thereof; (C) about 0.5 to about 50 parts by weight of a (meth)acrylate monomer, an oligomer having at least two (meth)acrylic functionalities per oligomer chain or mixtures thereof; and (D) about 0.01 to about 5 parts of a free radical initiator. Upon irradiating with UV radiation or heat curing, the styrenic block copolymer forms a crosslinked network with the (meth)acrylate monomer or oligomer.

Another embodiment is directed to an electronic device comprising an at least one layer of optically clear and reworkable pressure sensitive adhesive film. The pressure sensitive adhesive film comprises (A) from about 0.5 to about 20 parts of a styrenic block copolymer having fully hydrogenated and saturated soft blocks; (B) about 0.5 to about 80 parts by weight of a liquid diluent, a tackifier, or mixtures thereof; (C) about 0.5 to about 50 parts by weight of a (meth)acrylate monomer, an oligomer having at least two (meth)acrylic functionalities per oligomer chain or mixtures thereof; and (D) about 0.01 to about 5 parts of a free radical initiator. Upon irradiating with UV radiation or heat curing, the styrenic block copolymer forms a crosslinked network with the (meth)acrylate monomer or oligomer.

Yet another embodiment is directed to forming an optically clear and reworkable pressure sensitive adhesive comprising the steps of (1) preparing a pressure sensitive adhesive by mixing (A) from about 0.5 to about 20 parts of a styrenic block copolymer having fully hydrogenated and saturated soft blocks; (B) about 0.5 to about 80 parts by weight of a liquid diluent, a tackifier, or mixtures thereof; (C) about 0.5 to about 50 parts by weight of a (meth)acrylate monomer, an oligomer having at least two (meth)acrylic functionalities per oligomer chain or mixtures thereof; and (D) about 0.01 to about 5 parts of a free radical initiator at about 50° C. to about 150° C. to form a homogeneous melt; (2) applying the homogeneous melt onto a first release liner at a thickness of about 25 to about 250 µm as a pressure sensitive adhesive film; and (3) laminating the film with a second release liner, whereby the adhesive film is interdisposed in between the two release liners.

In another embodiment, an optically clear and reworkable pressure sensitive adhesive is formed by (1) preparing a pressure sensitive adhesive solution in about 50-90wt % heptane and/or xylene solution by dissolving (A) about 0.5 to about 20 parts of a styrenic block copolymer having fully hydrogenated and saturated soft blocks; (B) about 0.5 to about 80 parts by weight of a liquid diluent, a tackifier, or mixtures thereof; (C) about 0.5 to about 50 parts by weight of a (meth)acrylate monomer, an oligomer having at least two (meth)acrylic functionalities per oligomer chain or mixtures thereof; and (D) about 0.01 to about 5 parts of a free radical initiator at about 20° C. to about 90° C. to form a homogeneous solution; (2) applying the solution at about 20° C. to about 30° C. onto a first release liner at a thickness of about 25 to about 250 µm as a dried film; and (3) laminating the fully dried film with a second release liner, whereby the adhesive film is interdisposed in between the two release liners.

The steps may further comprises (4) preparing a first substrate; (5) removing the first release liner; (6) laminating the film onto the first substrate; (7) removing the second release liner; (8) laminating the film onto a second substrate; and (9) curing the film with UV or heat. The film adheres the first substrate and the second substrate together. The film is reworkable and can be removed at after step 8 and/or after step 9.

These and other aspects of the invention are described in the detailed description below. In no event should the above summary be construed as a limitation on the claimed subject matter which is defined solely by the claimed as set forth herein.

DETAILED DESCRIPTION OF THE INVENTION

Figure 1:
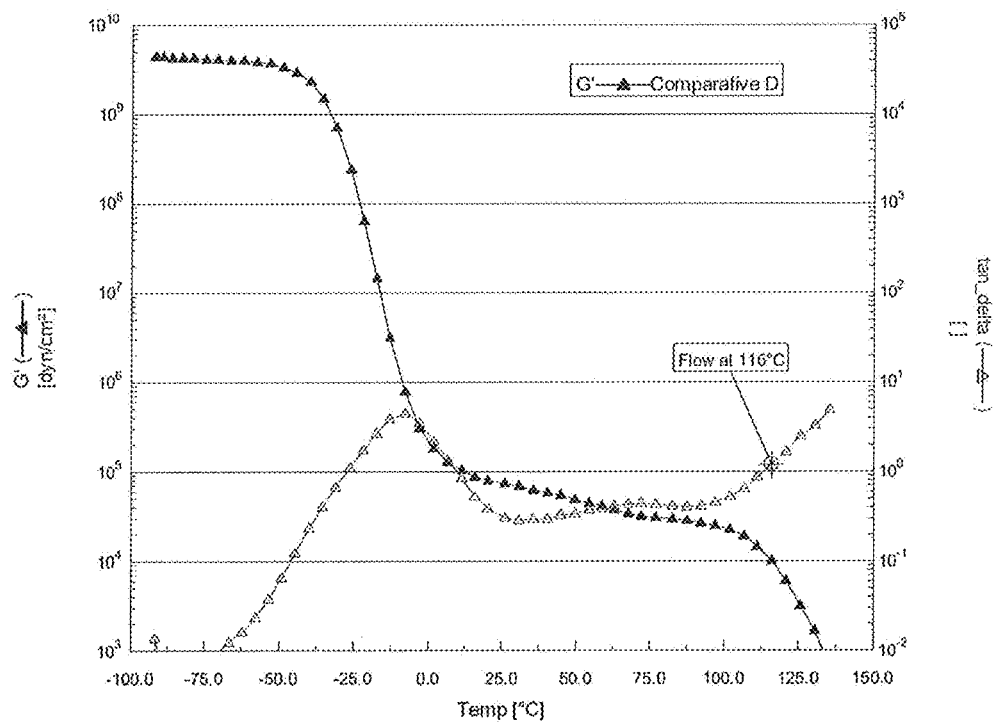
FIG. 1 shows RDA Temperature Sweep and Flow Temperature of Sample D.

The disclosures of all documents cited herein are incorporated in their entireties by reference.

As used herein, the term "pressure-sensitive adhesive" refers to a viscoelastic material which adheres instantaneously to most substrates with an application of slight pressure and remains permanently tacky. A polymer is a pressure-sensitive adhesive within the meaning of the term as used herein if it has the properties of a pressure-sensitive adhesive per se or functions as a pressure-sensitive adhesive by admixture with tackifiers, and/or other additives. Preferred adhesives will generally have a soft block Tg of from about −40° C. to about room temperature, more preferable from about −30° C. to about 10° C. Useful adhesives will preferably have a G' (storage modulus) less than about $6 \times 10^5$ dynes/cm$^2$ at 10 rad/s (25° C.), preferably less than about $5 \times 10^5$. Low G' provides an adhesive that is soft and easy to wet rough substrates and fill voids. Moreover, useful adhesives have elongation at break values greater than 200% and tensile strength greater than 15 psi. High elongation and high tensile strength maintains the film from breaking into multiple pieces during the rework process.

The pressure sensitive adhesive comprises a styrene block copolymer having fully hydrogenated and saturated soft blocks. The amount of the styrenic block copolymer component is preferably from about 0.01 to about 50 parts by weight, more preferably about 0.5 to about 20 parts by weight.

In one embodiment, the styrenic block copolymer is a linear block copolymer with a general block configuration of A-B-A, or A-B, wherein the A is a non-elastomeric polymer hard block having a homopolymers glass transition temperatures (Tg) of above 20° C., and B is a saturated elastomeric soft block soft block having a Tg of from about −30° C. to about room temperature, more preferable from about −30° C. to about 10° C. The hard or styrenic block may comprise homopolymers or copolymers of vinyl monomers such as vinyl arenes, vinyl pyridines, vinyl halides and vinyl carboxylates, as well as acrylic monomers such as acrylonitrile, methacrylonitrile, methyl esters of (meth)acrylic acids, etc., monovinyl aromatic hydrocarbons include particularly those of the benzene series such as styrene, alpha-methyl styrene, vinyl toluene, vinyl xylene, ethyl vinyl benzene as well as dicyclic monovinyl compounds such as vinyl naphthalene and the like. Other non-elastomeric polymer blocks may be derived from alpha olefins, alkylene oxides, acetals, urethanes, etc., styrenic copolymer is preferred.

The saturated soft or saturated elastomeric (hereinafter interchangeably used) block B of the copolymer is a hydrogenated isoprene, butadiene, or mixtures thereof, as taught, for example, in U.S. Pat. No. 3,700,633. The hydrogenation converts unsaturated C=C bonds to saturated C—C bonds. Selected conditions can be employed to fully hydrogenate the soft block while not so modifying the styrenic hard blocks. Other conditions may be chosen to hydrogenate substantially uniformly along the polymer chain, both the soft and hard styrenic blocks thereof being hydrogenated to practically the same extent. Block polymers with fully hydrogenated soft block minimize degradation during processing and device life time exposure to heat and light. Thus, styrenic block copolymer with fully hydrogenated and saturated soft block of isoprene, butadiene, or mixtures thereof, are preferred. Further, other soft block component that are useful are isobutylene, C4-C24 aliphatic esters of (meth) acrylic acids.

The styrenic block copolymer can have a broad ratio of hard block to soft block, and may have a ratio of about 5:95 or less, to about 40:60 or higher.

Non-limiting examples of block copolymers include triblock styrene-ethylene/butylene-styrene block copolymers (SEBS) and styrene-ethylene/propylene-styrene block copolymers (SEPS) available as KRATON G series. Other triblock copolymers useful in the present invention include hydrogenated polyisoprene/butadiene (SEEPS) having styrene monomer units and hydrogenated conjugated diene monomer available as SEPTON 4033-4055 from Kuraray; and hydrogenated poly-isoprene/butadiene polymers that consists of blocks of styrene monomers and hydrogenated conjugated diene monomer units. Also included are triblock copolymer, such as styrene-isobutylene-styrene block (SIBS) copolymers available from Kaneka, under the trade name SIBSTAR 062T, 073T. The styrenic block copolymers may also be branched or radial. Typical branched structures contain an elastomeric portion with at least three branches which can radiate out from a central hub or can be otherwise coupled or grafted together. The radial block copolymer comprises a structure of (polystyrene-midblock)$_x$, where X is a residue of a multifunctional coupling agent used in the production of the radial block copolymer, and n is a number equal to or greater than 3 and represents the number of polystyrene-midblock arms appended to X. The number n ranges on average from about 3 up to about 10. In one embodiment, up to 75% of linear block copolymer may be replaced with the branched or radial styrenic block copolymer.

In general, whether radial or linear, the styrenic block copolymer may contain diblock (A-B) as well, at levels up to 80% of the total.

In another embodiment, the styrenic block copolymer comprises a separate diblock copolymer, having a general A-B configuration, where A and B are as described previously above and also having a viscosity greater than 1000 cps at 25 C at 20 wt % in toluene. Preferred diblock copolymer are KRATON G1701X or 1702X which are both styrene ethylene propylene diblock polymers. KRATON G1702X is most preferred. While the adhesive formulation preferably contains the above diblock component for a better peel adhesion, the diblock copolymer may be replaced partially or entirely with other non-block polymer that is compatible with the adhesive formulations. For example, polyisobutylene (e.g., OPPANOL from BASF), polyisoprene (e.g., liquid isoprene rubber from Kuraray), polybutene (e.g Indopol from Ineos), polypropylene (e.g VISTAMAXX™ from ExxonMobil Chemicals), or styrene/butadiene copolymer (e.g., PLIOFLEX from Goodyear) or high flowabilty block copolymers SEPTON 2063, 2043 & 2002 from Kuraray) may also be used in amounts up to 40 parts by weight.

Optionally, a portion of the styrenic block copolymer may be replaced with non-block polymers that are compatible with the styrenic block copolymer. Examples of such polymer include amorphous polyalphaolefin (APAO), which are random copolymers or terpolymers of ethylene, propylene, and butene, and other substantially amorphous or semicrystalline polymers. Commercially suitable APAO includes REXTAC (Rexene LLC), EASTOFLEX (Eastman Corporation), and VESTOPLAST (Evonik Corporation). Metallocene catalyzed semicrystalline polyolefin with melting point less than about 100° C. can also be suitable in the pressure sensitive adhesive. Low melting point semicrystalline polyolefins may also replace the styrenic block copolymers in the adhesive, and examples of such semicrystalline polyolefins include C2-C6 polyolefins having a polydispersity index less than about 3. These low melting point semicrystalline polyolefins are commercially available from Exxon Mobil as the LINXAR series.

The pressure sensitive adhesive further comprises a liquid diluent, tackifier or mixtures thereof. The liquid diluent include oils, liquid plasticizers, and liquid rubbers. The diluents are known to associate with the particular blocks (domains) of the styrenic block polymer(s), altering the behavior of those portions accordingly. In more detail, the soft block portion or domain (i.e., the "B-block") of the polymer needs to have a Tg less than about room temperature. As other soft block compatible components such as liquid diluent and tackifiers are added, these components associate with the B domains swelling them and generally resulting in a change in the Tg thereof. For most pressure sensitive adhesive applications, a Tg in the range of about 0° C. to 25° C., however, for use herein soft block Tg ranges from −40° C. up to about 10° C., more preferably from about −20° C. to about 10° C. is preferred. A useful diluent is primarily aliphatic in character and is compatible with the polymer soft block. Included in these materials are plasticizers such as paraffinic and naphthenic petroleum oils, highly refined aromatic-free paraffinic and naphthenic food and technical grade white petroleum mineral oils, and liquid plasticizers such as the synthetic liquid oils or rubbers of polymerized C5 petroleum feed stream, polybutene, polyisobutylene, polyisoprene, polypropene, polyterpene, polybutadiene, or a copolymer thereafter and hydrogenated derivatives, etc., with weight average molecular weight (Mw) less than 100,000 g/mol. The synthetic oils are low viscosity oligomers which are permanently liquid monolefins, isoparaffins or paraffins. Preferably, the diluent is a white oil that does not yellow at elevated temperatures and/or over time. Commercially available liquid polybutene, polyisobutylene, polyisoprene, polybutadiene, include, but not limit to, polyisoprene available as LIR 50 from Kuraray, polybutenes available under the name of INDOPOL from Ineos, polyisobutylene under the names of OPPANOL and GLISSOPAL from BASF; polybutadiene under the names of Polybd45CT, Polybd2000CT, Polybd3000CT, CN307 available from Sartomer. Polyisoprene LIR-30, LIR-50, LIR-290 available from Kuraray, TEA-1000, TE2000, GI-1000, GI-2000, GI-3000, BI-2000, BI-3000, JP-100, available from Nippon Soda; BI-2000 is a hydrogenated 1,2-polybutadiene homopolymer with a number average molecular weight of around 2100. GI-2000 is a hydroxy-terminated hydrogenated 1,2-polybutadiene, with a number average molecular weight of around 2100. The liquid diluent in the adhesive is in the amount ranging from about 0.01 to about 80 parts, preferably, greater than about 10 parts.

Examples of tackifiers include rubbers of polymerized C5 petroleum feed stream and polyterpenes such as WING-TACK 10 available from Goodyear, and ESCOREZ 2520 available from Exxon Chemical. Suitable tackifiers are soft block tackifiers and they include any compatible resins or mixtures thereof such as (1) natural or modified rosins such, for example, as gum rosin, wood rosin, tall-oil rosin, distilled rosin, hydrogenated rosin, dimerized rosin, and polymerized rosin; (2) glycerol and pentaerythritol esters of natural or modified rosins, such, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natural terpenes, e.g., styrene/terpene and alpha methyl styrene/terpene; (4) polyterpene resins having a softening point, as determined by ASTM method E28,58T, of from about 80° to 150° C.; the latter polyterpene resins generally resulting from the polymerization of terpene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof, for example, as the resin product resulting from the condensation, in an acidic medium, of a bicyclic terpene and phenol; (6) aliphatic petroleum hydrocarbon resins having a Ball and Ring softening point of from about 50° to 135° C.; the latter resins resulting from the polymerization of monomers consisting of primarily of olefins and diolefins; also included are the hydrogenated aliphatic petroleum hydrocarbon resins; (7) alicyclic petroleum hydrocarbon resins and the hydrogenated derivatives thereof; and (8) aliphatic/aromatic or cycloaliphatic aromatic copolymers and their hydrogenated derivatives. Preferred tackifiers for use herein include polyterpenes such as PICCOLYTE A125 from Piova; aliphatic resins such as Wingtack 95 from Goodyear; cycloaliphatic resins such as EASTOTAC H100 from Eastman; and aliphatic/aromatic or cycloaliphatic/aromatic resins and their hydrogenated derivatives such as ECR 149B, ECR 179A, ESCOREZ 5380 from Exxon Chemical. Most preferred are the aliphatic or cycloaliphatic resins while the least desirable are the rosin esters or phenolic modified polyterpenes are least preferred. The desirability and selection of the particular tackifying agent is, in large part, dependent upon the specific block copolymer employed. The midblock tackifier in the adhesive is in the amount ranging from about 0.01 to about 80 parts, more preferably from about from about 10 to about 60 parts.

Additionally, it may be desirable to incorporate a hard block tackifying resin in the adhesive. Hard block tackifying resins are those resins described in U.S. Pat. No. 6,448,303 as residing in the non-elastomer domains of the rubber after the adhesive is cooled. Representative of such resins are the primarily aromatic resins based on mixed C9 petroleum distillation streams such as the PICCO materials available from Eastman, or resins based on pure or mixed monomer streams of aromatic monomers such as homo or copolymers of vinyl toluene, styrene, alpha-methyl styrene, coumarone or indene. Preferred are those based on alpha-methyl styrene available from Eastman under the KRISTALEX trade name. If present, the hard block resin is generally used in an amount of 1 to 30 parts by weight, preferably less than 10 parts.

The pressure sensitive adhesive further comprises free radical reactive functional components. One particular suitable reactive functional components are (meth)acrylic monomers or oligomers having at least two (meth)acrylic functionalities per oligomer chain. The amount of reactive functional components in the invention are ranged from about 1 to about 60 parts by weight, more preferably from about 0.5 to about 50 parts by weight, more preferably from about 5 to about 30 parts by weight, most preferably from atout 10 to about 25 parts based on the total weight of the adhesive.

Examples of suitable (meth)acrylate monomers in the invention are ester of (meth)acrylic acid including aliphatic, alicyclic, aromatic, heterocyclic, and/or epoxy functionality. In some embodiments, saturated long-chain alkyl (meth)acrylates, cycloaliphatic (meth)acrylates, (meth)acrylate/epoxy monomers, or combinations thereof can be utilized as monomers because they can enhance the miscibility with high molecular triblock copolymer and optional liquid diluents and tackifiers. The (meth)acrylate monomer can be unsubstituted or substituted with various groups such as hydroxy or alkoxy groups. Exemplary long chain alkyl (meth)acrylates include, but are not limited to, octyl (meth)acrylate, stearyl (meth)acrylate. Exemplary cycloaliphatic (meth)acrylates include, but are not limited to, isobornyl (meth)acrylate, tetramethylpiperidiyl methacrylate, pentamethylpiperidiyl methacrylate, dicyclopentanyl (meth)acrylate, dicyclopentenyl (meth)acrylate, and (meth)acrylated epoxies.

In some embodiments, (meth)acrylate monomers having two, three, four, or even more than four (meth)acrylate groups may be utilized and even preferred, which are called multifunctional (meth)acrylate monomers. It will also be understood by one of skill in the art that mixtures of multifunctional (meth)acrylate monomers can be utilized. The multifunctional (meth)acrylate monomer may be selected so as to enhance the adhesive cohesive strength after UV or heat cure and optimize adhesion and wettability of the adhesive composition. Examples of suitable multifunctional (meth)acrylate monomer in the invention are, but not limited to, 1,9-nonanediol di(meth)acrylate, 1,10-decanediol di(meth)acrylate, and tricyclodecanediol di(meth)acrylate, tricyclodecane dimethanol di(meth)acrylate, tetraethylene glycol diacrylate, dipentaerythritol pentaacrylate.

Free radical reactive oligomers in the invention include, but are not limited to, functional polyisobutylene (PIB) are described in U.S. Pat. Nos. 5,171,760 and 5,665,823, and Polymer Bulletin, Vol. 6, pp. 135-141 (1981), T. P. Liao and J. P. Kennedy. Representative polyisobutylene vinyl ethers are described in Polymer Bulletin, Vol. 25, pp. 633 (1991), J. P. Kennedy, and in U.S. Pat. Nos. 6,054,549 and 6,706,779. Preferred functionalized PIB is a free radical reactive polyisobutylene, butyl rubber derivatives, and like, which are terminated or grafted with pendant (meth)acrylic or 75% of alpha-olefin functional groups. Particularly, (meth)acrylate functional PIB have (i) a Mw of from about 1,000 to about 100,000 g/mol and (ii) contains greater than one free-radical reactive functional group per polymer chain. The functional PIB is made with functional group selected from terminal methacrylates, pendant methacrylates, terminal acrylates, and/or pendant acrylates.

Other free radical reactive oligomers in the invention also include, but are not limited to, (meth)acrylic terminal and pendant liquid polymers, or copolymers of butadiene, isoprene, ethylene, propylene, butene, and derivatives. These functionalized oligomers have a Mw from about 1,000 to about 100,000 g/mol and contains greater than one free-radical reactive functional group in the polymer chain. The functionalized oligomers are formed with free-radical functional group is preferably selected from terminal methacrylates, pendant methacrylates, terminal acrylates, and/or pendant acrylates. Exemplary functionalized oligomers include, but are not limited to, di(meth)acrylated-polybutadienes, di(meth)acrylated-polyisoprenes, hydrogenated di(meth)acrylated-polybutadienes, hydrogenated di(meth)acrylated-polyisoprenes, (meth)acrylated EPDM rubber (ethylene propylene diene copolymer), and (meth)acrylated butyl rubber, many of which are available from Sartomer and Kuraray. "(Meth)acrylated" is defined herein as being functionalized with either acrylate or methacrylate.

Yet exemplary other free radical reactive oligomers that are (meth)acrylated and can be partially or completely replace the functional PIB or polyolefin-like oligomers, include, but are not limited to, (meth)acrylated-polyurethanes, (meth)acrylated-polyesters, (meth)acrylated styrene-butadiene copolymer, (meth)acrylated acrylonitrile-butadiene copolymer, (meth)acrylated polysiloxanes, (meth)acrylated bromobutyl rubber (bromoisobutylene-isoprene copolymer), (meth)acrylated chlorobutyl rubber (chloroisobutylene-isoprene copolymer. These resins are commercially available without the (meth)acrylate functionality and can be functionalized without undue experimentation by those skilled in the art.

Examples of terminal and/or grafted pendant functionalities that are reactive and curable by radiation or heat in functional PIB or other polyolefins include, but are not limited to, those selected from the groups consisting of acrylate, methacrylate, vinyl, vinyl ether, propenyl, crotyl, allyl, silicon-hydride, vinylsilyl, propargyl, cycloalkenyl, thiol, glycidyl, aliphatic epoxy, cycloaliphatic epoxy, oxetane, itaconate, maleimide, maleate, fumarate, cinnamate esters, styrenic, acrylamide, methacrylamide, and chalcone groups. Acrylate and methacrylate are preferred. Also suitable are oligo(meth)acrylate, e.g., dicylcopentadieneylacrylate, as described in European Patent No. 2718385.

The pressure sensitive adhesive further comprises a free radical initiator. The radical cure initiator includes a radical polymerization initiator that generates radicals by electromagnetic energy rays such as UV light, or by heat. Radical photopolymerization initiating system comprising one or more photoinitiators can be found in Fouassier, J-P.,Photoinitiation, Photopolymerization and Photocuring Fundamentals and Applications 1995, Hanser/Gardner Publications, Inc., New York, N.Y. Suitable radical photoinitiators include Type I alpha cleavage initiators such as acetophenone derivatives such as 2-hydroxy-2-methylpropiophenone and 1-hydroxycyclohexyl phenyl ketone; acylphosphine oxide derivatives such as bis(2,4,6-trimethylbenzoyl) phenylphosphine oxide; and benzoin ether derivatives such as benzoin methyl ether and benzoin ethyl ether. Commercially available radical photoinitiators include Irgacure 651, Irgacure 184, Irgacure 907, and Darocur 1173 from BASF. Type II photoinitiators are also suitable for the curable adhesive, and they include benzophenone, isopropylthioxanthone, and anthroquinone. Many substituted derivatives of the aforementioned compounds may also be used. The selection of a photoinitiator for the radiation curable adhesive is familiar to those skilled in the art of radiation curing. The photoinitiator system will comprise one or more photoinitiators and optionally one or more photosensitizers. The selection of an appropriate photoinitiator is highly dependent on the specific application in which the adhesive is to be used. A suitable photoinitiator is one that exhibits a light absorption spectrum that is distinct from that of the resins, and other additives in the adhesive. The amount of the photoinitiator is typically is in a range of about 0.01 to about 10 parts, preferably, from about 0.1 to about 5 parts, based on the 100 parts of total weight of the adhesive.

The term radiation cure herein refers to crosslinking, toughening, hardening or vulcanization of the curable portion of the adhesives through actinic radiation exposure. Actinic radiation is electromagnetic radiation that induces a chemical change in a material, and for purposes within this specification and claims will include electron-beam curing. In most cases, such radiation is ultraviolet (UV) or visible light. The initiation of radiation cure is achieved through the addition of an appropriate photoinitiator. The cure of the adhesive is achieved by direct exposure to ultraviolet (UV) or visible light or by indirect exposure through transparent cover sheet that are made of polyester, polycarbonate, glass, and the like.

The term heat cure herein refers to toughening, hardening or vulcanization of the curable portion of the adhesive through exposure to heat in oven, infrared (IR), near IR, or microwave. The heat cure temperature is between 50-200° C., preferably 60-100° C. The initiation of the heat cure is achieved through the addition of an appropriate thermal radical initiator.

In one embodiment, the adhesive is cured through an optical clear cover sheet or front sheet, and the photoinitiator must be capable of absorbing radiation at wavelengths for which the cover or substrate sheets are transparent. For example, if an adhesive is to be cured through a sodalime glass coverplate, the photoinitiator must have significant UV absorbance above 320 nm. UV radiation below 320 nm will be absorbed by the sodalime glass coverplate and cannot reach the photoinitiator in the adhesive films. In this example, it would be beneficial to include a red shifted photoinitiator, or a photosensitizer with the photoinitiator as one photoinitiating system, to augment the transfer of energy to the photoinitiator. If an adhesive is to be cured through a PET film with cut off absorbance at 400 nm and below, the photoinitiator must have UV absorbance above 400 nm. Examples of such photointiators include, but are not limited to, IRGACURE® 819, IRGACURE® 2022, LUCIRIN® TPO, LUCIRIN® TPO-L, which are commercially available from BASF.

The thermally curable radical polymerization initiators include peroxides, such as, 1,1,3,3-tetramethylbutyl peroxy-2-ethyl-hexanoate, 1,1-bis (t-butylperoxy) cyclohexane, 1,1-bis(t-butylperoxy)cyclo-dodecane, di-t-butyl peroxy-isophthalate, t-butyl peroxybenzoate, dicumyl peroxide, t-butyl cumyl peroxide, 2,5-dimethyl-2,5-di(t-butylperoxy)hexane, 2,5-dimethyl-2,5-di(t-butylperoxy)-3-hexyne and cumene hydroperoxide. The amount of the thermal initiator is typically is in a range of about 0.01 to about 10 parts based on 100 parts of the total weight of the adhesive.

In one embodiment, the thermal-curing initiator is desirably selected to provide a moderate initiation temperature, which is high enough to prevent premature cross-linking, but also low enough to prevent exposing electronic devices to excess temperatures. Such excess temperatures may degrade the reactive organic components within the devices. Examples of suitable commercially available free radical thermal initiator include, but are not limited to, LUPEROX TBEC from United Initiators, TRIGONOX 101 and TRIGONOX 201 from Akzo Nobel Polymer Chemicals, LUPEROX 101 and LUPEROX 231 from Arkema, DICUP from GEO Specialty Chemicals, 2,5,-Dimethyl-2,5 BIS (Tert-Butyl Peroxy) Hexyne-3, such as those available under the trade designation LUPEROX 130 from Arkema, TRIGONOX 145 from Akzo Nobel Polymer Chemicals; Di-Tert-Butyl Peroxide such as those available under the trade designation TRIGONOX B from Akzo Nobel Polymer Chemicals. Typical cure temperatures for these free radical initiators typically range from about 50 to about 190° C., but temperatures can be increased for faster cures.

Optionally there may also be present 0 to 5 parts by weight of a wax component in the pressure sensitive adhesive. Suitable waxes compatible and not effecting the optical clarity of the adhesives include, but not limited to, petroleum based, conventional wax, natural-based wax, functionalized wax, and polyolefin copolymers. The term petroleum derived wax includes both paraffin and microcrystalline waxes having melting points within the range of from about 50° C. to about 110° C. as well as synthetic waxes such as low molecular weight polyethylene or Fisher-Tropsch waxes. Most preferred are polyethylene or Fisher-Tropsch waxes with a melting point of at least about 50° C.

In some embodiment, inorganic fillers may be used to improve the cohesive strength, rheology, and moisture and oxygen barrier properties of the adhesives. Representative fillers include, but are not limited to, ground quartz, fused silica, amorphous silica, talc, glass beads, graphite, carbon black, alumina, clays, graphene, nanoclay, mica, aluminum nitride, and boron nitride. Metal powders and flakes consisting of silver, copper, gold, tin, tin/lead alloys, and other alloys also are suitable fillers for conductive applications. Organic filler powders such as poly-(tetrachloro-ethylene), poly(chlorotrifluoroethylene), poly(vinylidene chloride) may also be used. The type and amount of such fillers suitable for use in adhesive formulations are within the expertise of the practitioner skilled in the art. Generally, such fillers will be present in amounts ranging from 0.1 to 50 parts of the total adhesive.

In a further embodiment, desiccant may be used to improve the moisture barrier properties of the adhesives. When added, desiccant comprise up to 20 part of the adhesives. The fillers with desiccant properties, referred to as desiccant fillers, suitable for use may be any of those that provide an appropriate moisture scavenging rate, capacity, and residual moisture level (the lowest level of moisture at which the desiccant can actively scavenge water) to meet the allowable moisture level for the specific electronic device. The desiccant fillers will be capable of reacting with, absorbing, or adsorbing water and/or water vapor. A representative list of such desiccants can be found in Dean, J. Lange's Handbook of Chemistry, 1999, McGraw Hill, Inc., New York, N.Y., pp. 11.5.

In general, suitable desiccants include metal oxides, such as, CaO, BaO, MgO; other oxides, such as $SiO_2$, $P_2O_5$, $Al_2O_3$; metal hydrides, such as $CaH_2$, NaH, $LiAlH_4$; metal salts, such as $CaSO_4$, $Na_2SO_4$, $MgSO_4$, $CaCO_3$, $K_2CO_3$, $CaCl_2$; powdered zeolites, such as 4A and 3A molecular sieves; metal perchlorates, such as, $Ba(ClO_4)_2$, $Mg(ClO_4)_2$; superabsorbant polymers, such as, lightly cross linked poly (acrylic acid); and metals that react with water, such as calcium. As with any filler, the desiccant filler particle size, particle size distribution, shape, and surface functionality will affect the level to which it can be loaded into a resin system and what rheology may result. Such factors are understood by those skilled in the art and are not otherwise relevant to the current inventive compositions. Blends of the more common non-desiccant fillers disclosed above and these desiccant fillers are contemplated and described within the examples. A common range for the particle size of the desiccant filler is from about 0.001 to about 200 micrometers. The practitioner with skill in the art will be able to determine the appropriate particle size range for the resin, rheology, and scavenging rate needed for the particular end use application.

The adhesive may optionally further comprise additives including thermal stabilizers, antioxidants, UV absorbers, and light stabilizers. Among the applicable stabilizers or antioxidants utilized herein include high molecular weight hindered phenols and multifunctional phenols such as sulfur and phosphorous containing phenols. Hindered phenols are well known to those skilled in the art and may be characterized as phenolic compounds which also contain sterically bulky radicals in close proximity to the phenolic hydroxyl group hereof. Any known thermal stabilizer may be suitable, and preferred classes of thermal stabilizers include, but are not limited to, phenolic antioxidants, alkylated monophenols, alkylthiomethylphenols, hydroquinones, alkylated hydroquinones, tocopherols, hydroxylated thiodiphenyl ethers, alkylidenebisphenols, O-, N- and S-benzyl compounds, hydroxybenzylated malonates, aromatic hydroxybenzyl compounds, triazine compounds, aminic antioxidants, aryl amines, diaryl amines, polyaryl amines, acylaminophenols, oxamides, metal deactivators, phosphites, phosphonites, benzylphosphonates, ascorbic acid (vitamin C), hydroxylamines, nitrones, thiosynergists, benzofuranones, indolinones, and mixtures thereof. Use of a thermal stabilizer is optional and in some instances is not preferred, especially if it reacts and degrades the active components within many the electronic device. When thermal stabilizers are used, they may be present at a level of about 0.0005 parts and up to about 10 parts by weight based on the total 100 parts by weight of the adhesive.

Other known UV absorber may be suitable for use in the adhesive composition, and preferred classes of UV absorbers include, but are not limited to, benzotriazole derivatives, hydroxybenzophenones, hydroxyphenyl triazines, esters of substituted and unsubstituted benzoic acids, and the like and mixtures thereof. Hindered amine light stabilizers (HALS) can be used and are also well known in the art. Generally, hindered amine light stabilizers are secondary, tertiary, acetylated, N-hydrocarbyloxy substituted, hydroxyl-substituted N-hydrocarbyloxy substituted, or other substituted cyclic amines which are characterized by a substantial amount of steric hindrance, generally derived from aliphatic substitution on the carbon atoms adjacent to the amine function. Use of a UV absorber is optional and in some instances is not preferred, especially if it reacts and degrades active organic component within the electronic device. When these UV absorbers are utilized, they may be present at a level of about 0.0005 parts and up to about 10 parts by weight based on the total 100 parts by weight of the adhesive.

The adhesive may optionally comprise adhesion promoters. Examples of adhesion promoters that are useful in the adhesive composition include, but are not limited to, C3-C24 alkyl trialkoxysilane, (meth)acryloxypropyltrialkoxysilane, chloropropylmethoxysilane, vinylthmethoxysilane, vinylthethoxysilane, vinyltrismethoxyethoxysilane, vinylbenzylpropylthmethoxysilane, aminopropyltrimethoxysilane, vinylthacetoxysilane, glycidoxypropyltrialkoxysilane, beta.-(3,4-epoxycyclohexyl)ethyltrimethoxysilane, mercaptopropylmethoxysilane, aminopropyltrialkoxysilane, and mixtures of two or more thereof. Use of a silane adhesion promoter is optional and in some instances is not preferred, especially if it reacts and degrades active organic component within the electronic device. When silane coupling agents are utilized, they may be present at a level of about 0.0005 parts and up to about 10 parts by weight based on the total 100 parts by weight of the adhesive.

The hot melt adhesives in the invention have a Brookfield viscosity range of from about 1,000 to about 900,000 cps at the coating temperature, typically in the ranges of about 50 to about 200° C., preferably 10,000, to 100,000 cps from about 90 to about 130° C. Such viscosity ranges allow the adhesive to be hot melt coat-able into films. Coating temperature higher than about 130° C. is not desirable for making PSA adhesive films and laminating the adhesive films onto substrates during electronic device assembly process that have heat-sensitive components. Forming above 130° C. tends to discolor the film and components organic photovoltaic module and LCD start degrading at around 110° C. and 80° C., respectively.

The film thickness ranges from about 25 to about 250 µm, preferably from about 50 to about 150 µm. The uncured adhesive films remain as pressure sensitive adhesive films at or below 35° C. and with minimal cold flow in storage.

The curable adhesive composition has low hardness, high optical transmission, and low shrinkage upon UV cure. Due to the low modulus and hardness, the adhesive film will not impose any Mura to the LCD while significantly improve the performance of the LCD display. The inventive adhesive film, therefore, may find use in thinner display designs. The cured adhesive film maintains soft and flexible and resists creep upon long term exposure to strain. The creep or cold flow can manifest as delamination failure of the flexible display or thin film photovoltaic when it is bent, or held vertical in rigid displays for a long period of time.

In a preferred embodiment, the hardness of the cured adhesive is shore OO 5 to 80, preferably 10 to 70. Hardness measurement in accordance with ASTM D 2240 is well known to a person skilled in the art. The hardness was measured curing the adhesive inside a container with a flat bottom to a thickness of 6.4 mm. The specimen is placed on a hard flat surface in a duometer. The indentor for the durometer (Model 1600 Dial-00 from Rex Gauge Co. Inc., IL, USA) is then pressed into the specimen making sure that it is parallel to the surface. The hardness is determined within one second of firm contact with the specimen.

The adhesive is considered to be optically clear, if it exhibits an optical transmission of at least 90% over 500-1100 nm. The measurement of optical transmission is known to the person skilled in the art. The optical transmission is typically conducted on a 125 µm thick sample in accordance with ASTM E903. Preferred testing method for transmission is as follows. A small film of adhesive is placed on a 75 mm by 50 mm plain micro slide (a glass slide from Dow Corning, Midland, Mich.), that had been wiped three times with isopropanol. A second glass slide is attached onto the adhesive under a force. Then the adhesive is fully cured under a UV source. The optical transmission is measured from wavelength 300 to 900 nm with a spectrometer Cary 300 from Agilent. One blank glass slide is used as the background.

According to another preferred embodiment, the shrinkage of the cured adhesive is less than 1.5%, preferably less than 1.0%, and most preferably essentially 0%. The UV curing shrinkage can be determined using a photorheometry. Photoreometric measurement can be performed with a Physica MCR301 Photorheometer from Anton Paar GmbH. The photorheometer has a pair of parallel plates and the bottom plate is made of quartz. An UV light (with UVA intensity of 93 mW/cm$^2$) is shined from a high pressure mercury arc (HPMA) lamp through the bottom plate to cure the adhesive sandwiched (with an initial gap of 1.00 mm) between the parallel plates which adhesive is tested under an oscillation mode (with a fixed angular frequency of 30 rad/s and 0.5% strain). The modulus is recorded with UV curing time. A zero fixed normal force (Fn) is used so that the gap is automatically reduced to accommodate sample shrinkage during curing. Gap vs. cure is plotted to report linear curing shrinkage of the sample. This is a convenient and well established technique for measurement of shrinkage and well known to the person skilled in the art.

The adhesive is useful for electronic devices and may be used as a reworkable, optically clear film. The adhesive has a maximum tan delta value lower than the room temperature, tensile strength greater than about 10 psi, preferably greater than about 15 psi, and elongation at break greater than 200%, and even greater than 500% or even greater than 1,000%. The soft block Tg was taken as the maximum in tan delta. Tensile strength was determined on 0.125" thick, 2.5" long dogbone shaped portions with 1"×1" end tabs and a 0.5"×0.5" central gage portion, and pulled on an Instron with pneumatic grips at a speed of 20"/min, and the maximum value was reported. Maximum elongation at break was measured in accordance with ASTM D638. The film can be removed readily from a substrate and remains either as a single film or a few big pieces.

The adhesive can be delivered as sheets or in rolls on substrates such as PET, glass, etc., or in between carrier films, such as PET or Kraft paper silicone release liners. In one embodiment, the adhesives are preferred to be coated as film and laminated between two liners to form adhesive free films that have pressure sensitive adhesive properties. The sheets or rolls comprising the adhesive films may be produced by any suitable process. For example, the sheets may be formed by solution casting or dip coating. Solution casting is prepared using techniques known in the art. Typically, the adhesive components are all dissolved in a solvent or a mixture of solvents e.g., xylene, toluene, heptane, hexane, cyclohexane, and the like, to form a solution. The solution is cast as a film with a specified weight per square meter, and the solvent is then let evaporate to form the PSA-like adhesive film.

Preferred coating processes are hot melt film extruding, compression molding, injection molding, lamination, tandem extrusion coating, hot melt extrusion casting, melt coextrusion casting, or any suitable melt processes known to those of skill in the art. The hot melts are prepared using techniques known in the art. Typically, the hot melts are prepared by blending the components in the melt at a temperature of about 50-190° C. until a homogeneous blend is obtained, generally in about 2-8 hours. The blending temperature should be kept as low as possible to avoid premature cross-linking and is depended on specific formulations and components, especially if the adhesive compositions are heat curable. Various methods of blending are known in the art and any method that produces a homogeneous blend is satisfactory. During the hot melt films coating process, the temperature of the hot melts should be maintained below 130° C. to avoid premature cross-linking, haze, yellowing or decomposition. In some film extrusion processes, the temperature of the hot melts are held at or below about 120° C.

The electronic device is assembled in various ways. In one embodiment, the adhesive film is applied as uncured PSA films during the assembly process of an electronic device. Upon removal of the first release liner, the exposed PSA adhesive film is laminated to either the cover sheet or the substrate sheet with pressure using rubber rolls and the like. Subsequently, the second liner is removed and the exposed adhesive surface is laminated to the remaining front sheet or the substrate. In one embodiment, the adhesive film is laminated to both front sheet and substrate simultaneously. Heat with temperature ranging from about 10° C. to about 190° C., preferably from about 20° C. to about 80° C., and/or vacuum and/or pressure can be applied to enhance lamination, and to remove any entrapped air and to eliminate any voids between layers. In another embodiment, because organic active components on the substrate start to decompose at temperatures above 120° C., preferred laminating temperature ranges below about 110° C., and in some application below about 80° C. The curable adhesive film can be then cured by heat or UV radiation. Heat cure can be completed with temperatures of from about 50 to about 190° C. UV cure is completed with UV light wavelength ranging from about 280 to about 700 nm.

The inventive adhesive film is coated and/or laminated on to an electronic device. The adhesive flows and provides good wetting and ink filling during the electronic assembly process. Prior to the lamination step, the adhesive film withstands shipping and storage temperatures under stress, as the films are stored on a reel roll. Additionally, the adhesive flows at a low enough temperature to avoid damaging any heat sensitive components in the device during lamination. Thus, it is desirable for the flow temperature of the adhesive be as low as possible while still be above the minimum ambient storage temperature. Flow temperature (also known as the crossover temperature) is the temperature at which the adhesive crosses over from a solid state to a liquid state, and it is the temperature value at $G''=G'$ (tan $\delta=1$). The hot melt adhesive in the invention has a flow temperature of about 45° C. to about 120° C., preferably from about 50° C. to about 110° C., and more preferably from above 50° C. to about 80° C.

After lamination and then a subsequent cure, the inventive adhesive film no longer flows, and thus, the flow temperature of the cured adhesive is essentially the decomposition temperature. The styrenic copolymer and the (meth)acrylate monomer or oligomer having at least two (meth)acrylic functionalities per oligomer chain forms a crosslink network upon radiation and/or heat. Without being bound to any theory, it is believed that the soft block and the monomers or oligomers are partially interlaced and, to some degree, covalently bonded to each other to form the crosslinked network. This network is entangled in a way that they cannot be readily separated. The lack of a flow temperature of the adhesive after cure indicates the formation of a crosslink network, and this provides good creep resistance during the lifetime of the electronic device.

In one embodiment, the adhesive film has irregular surfaces on both sides, and thus facilitate deaeration with the substrate and cover during the lamination process. Irregular surfaces can be created by mechanically embossing or by melt fracture during extrusion of the sheets followed by quenching so that surface roughness is retained during handling. The surface pattern can be applied to the sheet through well-known, common art processes. For example, the extruded sheet may be passed over a specially prepared surface of a die roll positioned in close proximity to the exit of the extruder die. This imparts the desired surface characteristics to one side of the molten polymer exiting the die. Thus, when the surface of such a die roll has minute peaks and valleys, it will impart a rough surface to the side of the polymer sheet that passes over the roll, and the rough surface will generally conform respectively to the valleys and peaks of the roll surface. Such die rolls are described in, e.g., U.S. Pat. No. 4,035,549 and U.S. Patent Publication No. 2003/0124296.

In another embodiment, the adhesive films may be in a single layer or in multilayer form. The term "single layer" refers to sheets that are made of or that consist essentially of adhesive described in the invention. When in a multilayer form, the sheet comprises sublayers, and at least one of the sub-layers is made of or consists essentially of the adhesive in the invention, while the other sub-layer(s) may be made of or comprise any other suitable polymeric material(s), such as, for example, copolymers of α-olefins and α, β-ethylenically unsaturated carboxylic acids (i.e., acid copolymers), partially neutralized ionic acid copolymers (i.e., ionomers), ethylene/vinyl acetate copolymers, polyvinyl acetals) (including acoustic grade polyvinyl acetals), polyurethanes, polyvinylchlorides, polyethylenes (e.g., linear low density polyethylenes), polyolefin block copolymer elastomers, copolymers of α-olefins and α, β-ethylenically unsaturated carboxylic acid esters (e.g., ethylene methyl acrylate copolymers and ethylene butyl acrylate copolymers), silicone elastomers, epoxy resins, and combinations of two or more thereof.

There are several methods to form an optically clear, reworkable pressure sensitive adhesives. The adhesive can be formed as a melt or as in a solution to form a film.

In one embodiment, an electronic device is prepared with an optically clear, reworkable pressure sensitive adhesive comprising the steps of (1) preparing a pressure sensitive adhesive (A) about 0.5 to about 20 parts of a styrenic block copolymer having fully hydrogenated and saturated soft blocks; (B) about 0.5 to about 80 parts by weight of a liquid diluent, a tackifier, or mixtures thereof; (C) about 0.5 to about 50 parts by weight of a (meth)acrylate monomer, an oligomer having at least two (meth)acrylic functionalities per oligomer chain or mixtures thereof; and (D) about 0.01 to about 5 parts of a free radical initiator at about 50° C. to about 150° C. to form a homogeneous hot melt; (2) applying the hot melt at about 50° C. to about 150° C. onto a first release liner at a thickness of about 25 to about 250 μm as a film; (3) laminating the film with a second release liner.

In another embodiment, an optically clear and reworkable pressure sensitive adhesive is formed by (1) preparing a pressure sensitive adhesive solution in about 50-90wt % heptane and/or xylene solution by dissolving (A) about 0.5 to about 20 parts of a styrenic block copolymer having fully hydrogenated and saturated soft blocks; (B) about 0.5 to about 80 parts by weight of a liquid diluent, a tackifier, or mixtures thereof; (C) about 0.5 to about 50 parts by weight of a (meth)acrylate monomer, an oligomer having at least two (meth)acrylic functionalities per oligomer chain or mixtures thereof; and (D) about 0.01 to about 5 parts of a free radical initiator at about 20° C. to about 90° C. to form a homogeneous solution; (2) applying the solution at about 20° C. to about 30° C. onto a first release liner at a thickness of about 25 to about 250 μm as a dried film; and (3) laminating the fully dried film with a second release liner, whereby the adhesive film is interdisposed in between the two release liners.

The optically clear and reworkable pressure sensitive adhesive is further formed by the steps: (4) preparing a substrate; (5) removing the first release liner; (6) laminating the film onto the substrate; (7) removing the second release liner; (8) laminating the film onto a cover sheet; and (9)

curing the film with UV or heat. The film adheres the first substrate and the second substrate together. The film is removable at after step (6), (7), (8) and/or (9).

The adhesive film is reworkable before the cure step. This is especially useful for electronic devices such as LCD display, LED display, touch screen, flexible thin film photovoltaic cells, and the like, because they include expensive components. If a defect is found before the adhesive film is cured, the film can be simply removed (reworked), from either the cover sheet or the substrate. The inventive adhesive film remains as a single piece or breaks into few pieces that can be readily removed without solvent and without damaging the expensive components. The cover sheet and the substrate can be reused with another adhesive film to form the electronic device.

The adhesive film is also reworkable after the cure step. If defect is determined after the adhesive film is cured, the cured adhesive film can be simply removed, from the cover sheet or the substrate. The cured adhesive film remains as a single piece or breaks into few pieces that can be readily removed without solvent and without damaging the expensive components. The cover sheet and the substrate can be reused with another adhesive film to form the electronic device.

The pressure sensitive adhesive and film invention is useful in mobile phone, tablet PC, TV, notebook PC, digital camera, photo frame, car navigation, outdoor display, and the like.

The curable adhesive is also useful as an encapsulant for photovoltaic module/cell (hereinafter interchangeably used). In forming the photovoltaic cell, the encapsulant sheet or roll, comprising the curable pressure sensitive adhesive film, is laminated to the photovoltaic module assembly. The photovoltaic module assembly includes any article or material that can convert light into electrical energy. Useful photovoltaic cell includes, but are not limited to, wafer-based photovoltaic cells (e.g., c-Si or mc-Si based photovoltaic cells, and thin film photovoltaic cells (e.g., a-Si, c-Si, CdTe, copper indium selenide (CIS), copper-indium-gallium selenide (GIGS), light absorbing dyes, or organic semiconductor based solar cells. Within the photovoltaic module assembly, it is preferred that the cells be electrically interconnected or arranged in a flat plane. In addition, the photovoltaic module assembly may further comprise electrical wirings, such as cross ribbons and bus bars.

The photovoltaic module assembly may be bifacial. In such embodiments, all the laminating materials positioned on either side of the photovoltaic cell should be sufficiently transparent to allow adequate sunlight or reflected sunlight to reach the photovoltaic cells. Alternatively, the photovoltaic cell may have a front sun-facing side (which is also referred to as a front side and, when in actual use conditions, generally faces toward the sun) and a back non-sun-facing side (which is also referred to as a back side and, when in actual use conditions, generally faces away from the sun). The photovoltaic cells define the boundary between the front and back sides of the photovoltaic cell assembly. In such assembly, all the materials that are present in the laminate layers positioned in the front sun-facing side of the solar cell assembly should have sufficient transparency to allow adequate sunlight to reach the photovoltaic cells. The materials present in the laminate layers positioned in the back non-sun-facing side of the photovoltaic cell layer need not be transparent. The photovoltaic cell typically comprises at least one encapsulant layer, which is laminated to the solar cell assembly. Two components that are "laminated" to each other are bonded either directly or indirectly (i.e., with additional material, such as interlayer or adhesive materials, between the two layers). In certain cases, the encapsulant layer comprising the blend composition is directly bonded to the photovoltaic cell layer.

In one embodiment, the photovoltaic cell assemblies have irregular surfaces with peaks and voids. Therefore, during the lamination process, the encapsulant film will melt and flow over and fill the voids of the photovoltaic cell assembly in a uniform manner. The thickness of the encapsulant layer, unless otherwise specified in limited circumstances, is the thickness of the adhesive layer prior to lamination. In general, however, the encapsulant layer in the final photovoltaic module remains at an average total thickness of about 1 to about 120 mils (about 0.025 to about 3 mm), preferably about 2 to about 40 mils (about 0.05 to about 1 mm).

The photovoltaic cell may further comprise other functional film, sheet layers, encapsulant layers (e.g., dielectric layers or barrier layers) embedded within the module. Such functional layers may comprise any of the above mentioned polymeric films or those that are coated with additional functional coatings. For example, poly(ethylene terephthalate) (PET) films coated with a metal oxide coating, such as those described in U.S. Pat. Nos. 6,521,825 and 6,818,819 and European Patent No.1182710, may function as oxygen and moisture barrier layers in the laminates. Additional encapsulant layers comprise other polymeric materials, such as acid copolymers, ionomers, ethylene/vinyl acetate copolymers, polyvinyl acetals (including acoustic grade polyvinyl acetals), polyurethanes, polyvinyl chlorides, polyethylenes (e.g., linear low density polyethylenes), polyolefin block copolymer elastomers, copolymers of alpha-olefins and alpha,beta-ethylenically unsaturated carboxylic acid esters) (e.g., ethylene methyl acrylate copolymers and ethylene butyl acrylate copolymers), silicone elastomers, epoxy resins, and combinations of two or more thereof. Suitable films for the incident layer or the backing layer comprise polymers that include but are not limited to, polyesters (e.g., poly(ethylene terephthalate) and poly(ethylene naphthalate)), polycarbonate, polyolefins (e.g., polypropylene, polyethylene, and cyclic polyolefins), norbornene polymers, polystyrene (e.g., syndiotactic polystyrene), styrene-acrylate copolymers, acrylonithle-styrene copolymers, polysulfones (e.g., polyethersulfone, polysulfone, etc.), nylons, poly(urethanes), acrylics, cellulose acetates (e.g., cellulose acetate, cellulose triacetates, etc.), cellophane, silicones, polyvinyl chlorides) (e.g., polyvinyl idene chloride)), fluoropolymers (e.g., polyvinyl fluoride, polyvinylidene fluoride, polytetrafluoroethylene, and ethylene-tetrafluoroethylene copolymers), and combinations of two or more thereof. The polymeric film may be non-oriented, or uniaxially oriented, or biaxially oriented. Specific examples of films that may be used in the photovoltaic cell module outer layers (e.g., the incident layer or the backing layer) include, but are not limited to, polyester films (e.g., poly(ethylene terephthalate) films), fluoropolymer films (e.g., Tedlar®), Tefzel®), and Teflon®) films available from DuPont). Metal films, such as aluminum foil, may also be used as the backing layers. Further the films used in the solar cell module outer layers may be in the form of multi-layer films, such as a fluoropolymer/polyester/fluoropolymer multilayer film (e.g., Tedlar®)/PET/Tedlar®) or TPT laminate film available from Isovolta AG or from Madico.

In a preferred embodiment, the curable encapsulant film is suitable for flexible thin film photovoltaic cells, CIGS photovoltaic cells, and the like. In an even more preferred embodiment, the encapsulant is suitable as an encapsulant for thin film organic photovoltaics (OPV) or Organic Light Emitting Diode (OLED), where the moisture and oxygen barrier requirements are most demanding. The curable encapsulant film has a number of advantages over conventional liquid encapsulants. The curable encapsulant film described herein allows the material to fully flow around and over the irregular surfaces of the photovoltaic cell assembly during laminating process and therefore minimize air bubbles, and cell breakage. Further, the incorporation of the block copolymer and fully compatible reactive (meth) acrylic functionalized PIB or polyolefin oligomer/polymer deliver high moisture and oxygen barrier properties and the optical clarity of the encapsulant layer.

In one embodiment, an organic photovoltaic cell with an encapsulant layer containing no volatile low molecular weight (having a Mw less than about 1,000 g/mol) organic or acidic molecule has a higher module efficiency than cells with encapsulant layer containing volatile low molecular weight molecules. Without wishing to be bound by theory, it is believe that presence of such molecules in the encapsulant layers may create voids upon heating, affect the adhesion between the adhesive layer and the active organic layer, and more importantly change the morphology of active organic layers because of the migration and solvation of low organic molecules in the active organic layer. As it is known from "Organic Photovoltaics: Challenges and Opportunities," by Russell Gaudiana, J. of Polymer Science: Part B: Polymer Physics 2012, DOI: 10.1002/polb.23083, the morphology of active layer is crucial to the module efficiency. For example, a high percentage of process time is focused on controlling the rate of evaporation of the solvent from active organic components because it is the major factor in establishing the optimum morphology of the active layer. The coating quality of the active layer is determined by the precise thickness, surface roughness, and pinhole-free film as possible.

Yet in another embodiment, the curable adhesive described herein is used as. UV curable optically clear adhesive film and/or tape (UV OCA). The UV OCA film enables the bonding of optical assemblies, for example bonding the cover lens to a LCD module without any Mura problem or at least the best possible prevention of Mura. The term "UV-curable optically clear adhesive" has been established in the art and known to the person skilled in the art. Optically-clear adhesive (OCA) is widely used in touch panels and display devices to bind the cover lens, plastic or other optical materials to the main sensor unit. UV OCA are generally used to improve the optical characteristics of the device as well as improve other attributes such as durability and process efficiency. The UV OCA is generally used for example to bond the touch panel to the main liquid crystal display, and also to bond any protective cover, such as the lens, to the touch panel. Major applications UV OCA include capacitive touch panels, 3D televisions and glass retarders.

The process of incorporating UV OCA in the LCD, LED, touch panel devices can be done in several way. In one example, the "top substrate" is a cover lens, which is optically transparent. The "base substrate" can be for example a display panel, or a LCD, that is forms the base for the top substrate. The UV OCA film is preferably applied on the top side of the base substrate. UV OCA film is typically protected between two release liners, the first liner is thinner (12-30 μm) and easier to remove, and the other is thicker (35-50 μm) has higher release force. The UV OCA film, after the first liner is removed, is applied onto the top side of the base substrate by slowly pressing and laminating in one direction by a rubber roll. The second liner is removed and the top substrate is then attached to the surface of the adhesive film preferably under vacuum condition. Vacuum conditions are especially preferred for a bubble-free bonding. If vacuum condition is used, then the vacuum level should preferably be less than about 0.1 MPa. If heat is applied, the preferred temperature range is between about 40 to about 80° C. Sometimes, a pressure is required for a better bubble-free lamination, the preferred pressure range is between about 0.1 to about 0.6 MPa.

The UV OCA is cured through the top substrate by exposure to electromagnetic radiation comprising a wavelength ranging from 200 nm to 700 nm, preferably from 450 nm to 500 nm. Optionally, the adhesive film can be laminated to the top substrate first. Yet another option is before any lamination, the films is first partially or fully cured by exposure to electromagnetic radiation. The degree of UV curing can preferably be measured using a Fourier Transfer Infrared (FTIR) spectrometer with an ATR (attenuated total reflactance) fixture, such as zinc selenide crystal. The curing degree can be easily determined by measuring the decrease of the IR absorption at an absorption peak which is characteristic to the corresponding formulation chemistry. For example, IR absorption at 812 $cm^{-1}$ corresponds to the acrylate double bond, and can be used for measuring the curing degree of acrylate chemistry. This is well established and well known to the person skilled in the art. UV-radiation can preferably be supplied using a high intensity continuously emitting system such as those available from Fusion UV Systems. A metal halide lamp, LED lamp, high-pressure mercury lamp, xenon lamp, Xenon flash lamp etc. can be used for UV-radiation. UV energy should be around 100 to 5,000 $mJ/cm^2$.

In a preferred embodiment, the top substrate is selected from glass and polymer, preferably plastic films, including in particular polyethylene terephthalate, polymethyl (meth) acrylate, and/or triacetate cellulose (TAC). In another preferred embodiment, the top substrate is selected from a reflector, cover lens, touch panel, retarder film, retarder glass, a LCD, a lenticular lens, a mirror, an anti-glare or anti-reflective film, an anti-splinter film, a diffuser, or an electromagnetic interference filter. For example for 3D TV applications, a glass or film retarder will be bonded onto a LCD for passive 3D TV, or a TN LCD or lenticular lens is bonded a regular TFT LCD for naked eye 3D. The base substrate is a LCD module with polarizer film on top. The base substrate can be a display panel, preferably selected from a liquid crystal display, a plasma display, a light-emitting diode (LED) display, an electrophoretic display, and a cathode ray tube display.

Yet in another preferred embodiment, the display panel has touch functionality. The adhesive and the application process of the invention can be used for any touch panel sensor assembly. They can preferably be used to bond touch panel sensors that require two layers of indium-tin-oxide coated glass. They can preferably be used for cover lens bonding, in particular to fill the air gap in touch panel sensors that utilize a cover lens, such as clear plastic polymethyl (meth)acrylate, and the glass touch panel sensor. They can preferably be used for direct bonding, preferably to directly bond the cover lens to a LCD module. In another embodiment, the invention comprises the possibility of two or more top substrates bonded one after another onto a base substrate with the UV OCA between layers.

EXAMPLES

The invention will be described further in the following examples, which are included for purposes of illustration and are not intended, in any way, to be limiting of the scope of the invention. In the examples which follow, unless otherwise specified, all parts are by weight and all temperatures in degree Celsius. All viscosities were measured using a Brookfield viscometer with a #27 spindle.

A Rheometrics Dynamic Mechanical Analyzer (Model RDA 700) was used to obtain the elastic moduli (G'), loss modulus (G") and tan delta versus temperature sweep. The instrument was controlled by Rhios software version 4.3.2. Parallel plates 8 mm in diameter and separated by a gap of about 2 mm were used. The sample was loaded and then cooled to about −100° C. and the time program started. The program test increased the temperature at 5° C. intervals followed by a soak time at each temperature of 10 seconds. The convection oven was flushed continuously with nitrogen. The frequency was maintained at 10 rad/s. The initial strain at the start of the test was 0.05% (at the outer edge of the plates). An autostrain option in the software was used to maintain an accurately measurable torque throughout the test. The option was configured such that the maximum applied strain allowed by the software was 80%. The autostrain program adjusted the strain at each temperature increment if warranted using the following procedure. If the torque was below 200 g-cm the strain was increased by 25% of the current value. If the torque was above 1200 g-cm it was decreased by 25% of the current value. At torques between 200 and 1200 g-cm no change in strain was made at that temperature increment. The shear storage or elastic modulus (G') and the shear loss modulus (G") are calculated by the software from the torque and strain data. Their ratio, G"/G', also known as the tan delta, was also calculated. The soft block Tg was taken as the maximum in tan delta. Flow temperature was reported as the temperature where elastic modulus and loss modulus values equal to one another: G"=G'.

Tensile strength and elongation was determined on 0.125" thick, 2.5" long dogbone shaped portions with 1"×1" end tabs and a 0.5"×0.5" central gauge portion. These were pulled on an Instron with pneumatic grips at a speed of 20"/min. Strength was taken as the maximum stress and elongation was taken at break during test, in accordance with ASTM D638.

Two mil thick adhesive drawdowns were made on 1.5 mil polyester backing film. These were used to conduct loop tack tests using a TMI loop tack tester on stainless steel plates. Peel tests were conducted by bonding one inch wide strips of adhesive to polished stainless steel using two passes of a 2 kg roller. After a 20 minute dwell time the adhesive strips were pulled at 2 inches/minute on an Instron and the average peel force recorded.

Optical transmittance (% T) in accordance with ASTM E903, dielectric constant (DK), refractive index (nD) and hardness were measure using pure and cure adhesive films (10-18 mil). The 10 to18 mil adhesive were coated at 130° C., unless otherwise specified, as hot melt, using a lab scale hot melt coater, Hot Melt Coater HLC-101 from ChemInstruments, onto a 2 mil PET (polyethylene terephthalate) silicone release liner and then covered with tighter 3 mil PET liner. The adhesive film was cured by irradiating with D-bulb (Fusion Systems) with a dosage of UVA&V 5000 mJ/cm$^2$. Optical transmittance (% T) was measured with Perkin Elmer UVNis pectrometer. Refractive Index values were measured with ABBE Refractomer by ATAGO. The hardness (Shore OO) of the cured adhesive film was measured in accordance with ASTM D 2240, Durometer (Model 1600 Dial-00 from Rex Gauge Co. Inc., Illinois, USA).

Shear strength of the cured adhesive films were measured according to Procedure A, PSTC-107, adapted as follows: (1) the adhesive was coated at 2-5 mil thickness as described above on a 2 mil PET film, laminated with 2 mil PET release liner, cured as described above, and then conditioned at 23° C. and 50% relative humidity, (2) the shear adhesion was measured under a shear load of 500g on a 12×25 mm area, applied after wetting out the stainless test panel for 15 min. The shear strength testing was performed at 23° C. and 50% relative humidity.

Components To The Examples

KRATON G1651 is a SEBS triblock copolymer and G1702 is a SEP diblock copolymer of styrene and hydrogenated isoprene available from Krayton Polymers.

SEPTON 4055 and 4033 are SEEPS triblock copolymers from Kuraray, viscosity measured with 10 wt % polymer in toluene at 30° C. is 5,800 cps and 50 cps, respectively.

OPPANOL B15 is a polyisobutylene polymer from BASF.

KRISTALEX 3085 is an alpha-methyl styrene/styrene end block resin available from Eastman Chemical.

ESCOREZ 5000 series are water white cycloaliphatic hydrocarbon resin from Exxon Mobil Chemical.

REGALITE R-10 is an aliphatic liquid resin available from Eastman.

LUMINOL T350 is a paraffinic white oil available from Petrocanada.

KAYDOL is a napthenic white oil available from Witco. White oil is a white oil.

CN308 is a reactive hydrogenated polybutadiene diacrylate from Sartomer.

LUCIRIN TPO is a photoinitiator from BASF.

IRGANOX 1010 is a hindered phenol antioxidant available from BASF.

Comparative Examples A-D

The following formulations described herein were prepared in a Brabender mixer with sigma blades. The rubbers and about half the plasticizers were added to a bowl preheated to about 150° C. Once homogenous, solid tackifiers were added, followed by additional plasticizers. The formulations are shown in Table 1. The adhesive properties are shown in Table 2.

TABLE 1

Adhesive Formulations

| Compositions | Comparative A | Comparative B | Comparative C | Comparative D |
|---|---|---|---|---|
| SEPTON 4055 | 5 | 5 | 5 | 5 |
| KRATON G1702 | 5 | 5 | 5 | 5 |
| KRISTALEX 3085 | 15 | 15 |  | 15 |
| REGALITE R-10 | 65 | 40 |  |  |
| LUMINOL T350 |  | 20 |  | 45 |
| KAYDOL |  |  | 65 |  |
| ESCOREX 5340 |  |  | 25 |  |
| ESCOREX 5400 | 15 |  |  |  |
| ESCOREX 5415 |  | 20 |  | 35 |
| IRGANOX 1010 | 0.5 | 0.5 | 0.5 | 0.5 |

TABLE 2

Adhesive Properties

| Examples | Comparative A | Comparative B | Comparative C | Comparative D |
|---|---|---|---|---|
| Viscosity (cP), at 135° C. | 299,500 | 321,000 | — | — |
| Viscosity (cP) at 163° C. | 10,900 | 10,525 | 18,400 | 4438 |
| Loop tack (oz/in$^2$) | 107 | 68 | 9 | 53 |
| Peel (oz/in) | 50 | 13 | 0.4 | 6.3 |
| Ghosting (residue) | Heavy | Heavy | Trace | Trace |
| G' (10$^5$ dynes/cm$^2$, 25° C.) | 1.6 | 0.9 | 0.6 | 0.7 |
| G" (10$^5$ dynes/cm$^2$, 25° C.) | 1.6 | 0.4 | 0.2 | 0.2 |
| Tan delta (25° C.) | 1.0 | 0.4 | 0.3 | 0.3 |
| Flow temperature (G' = G"), ° C. | | | | 116 |
| Soft block Tg (° C.) | 6 | −6 | −32 | −8 |

Comparative Examples A, B, C and D correspond to adhesives described in U.S. Pat. No. 5,559,165 and 6,448,303. When very high molecular weight block copolymer (high viscosity) SEPTON 4055 is used in the adhesive, the resultant viscosities are high and/or the flow temperature is high. It is expected that these adhesives have good creep resistance at elevated temperatures; however, they also require higher coating/lamination temperatures. Higher coating/lamination temperatures are not desirable for making PSA adhesive films and laminating the adhesive films onto substrates during electronic device assembly process that have heat-sensitive components, e.g., preferred coating temperature for making block copolymer adhesive films is below 130° C. to avoid yellowing, preferred laminating temperature for organic photovoltaic module is below 110° C., and preferred laminating temperature for LCD is below 80° C. Comparative example D shows a flow temperature at 116° C. (FIG. 1). In order to coat/laminate at lower temperatures, lower molecular weight polymer can be used; however, creep resistance becomes problematic for adhesives made with low molecular weight polymers unless they are able to be cured.

Example 1-4, Comparative E

Figure 2:
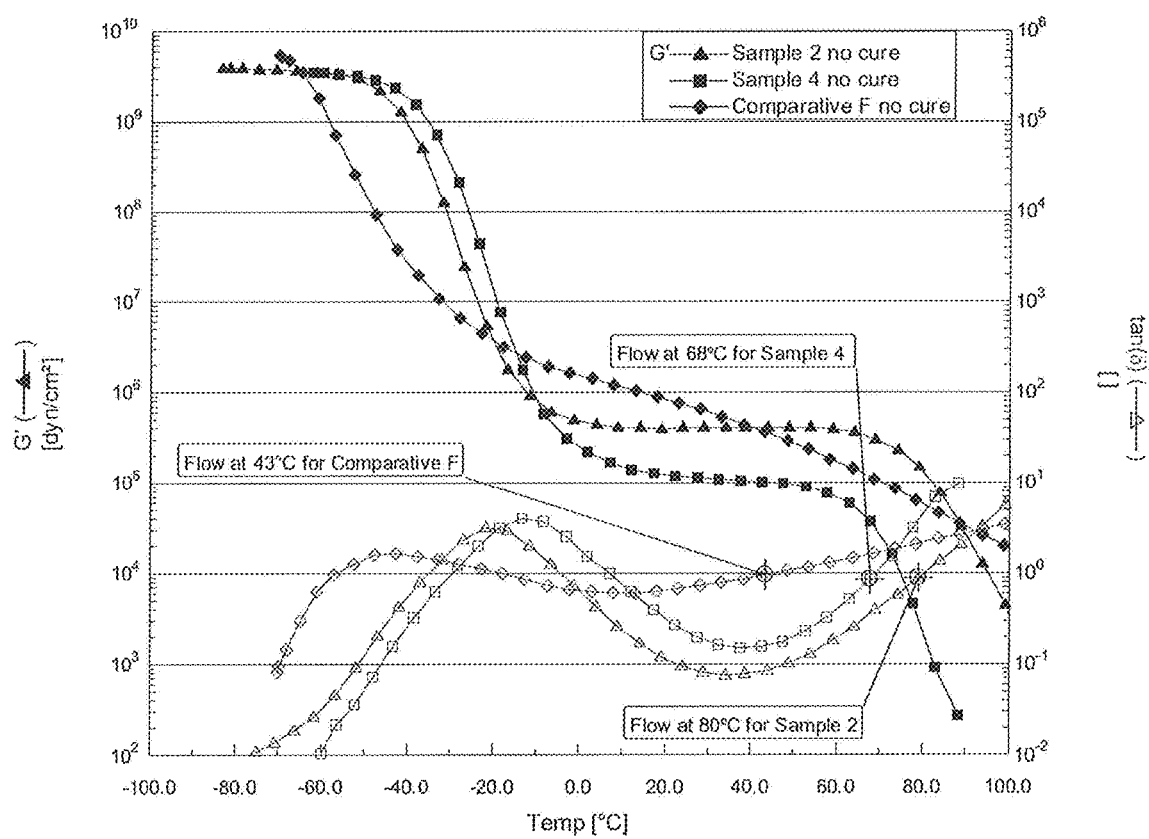
FIG. 2 shows RDA Temperature Sweep and Flow Temperatures of Samples 2, 4, and F before cure.
Figure 3:
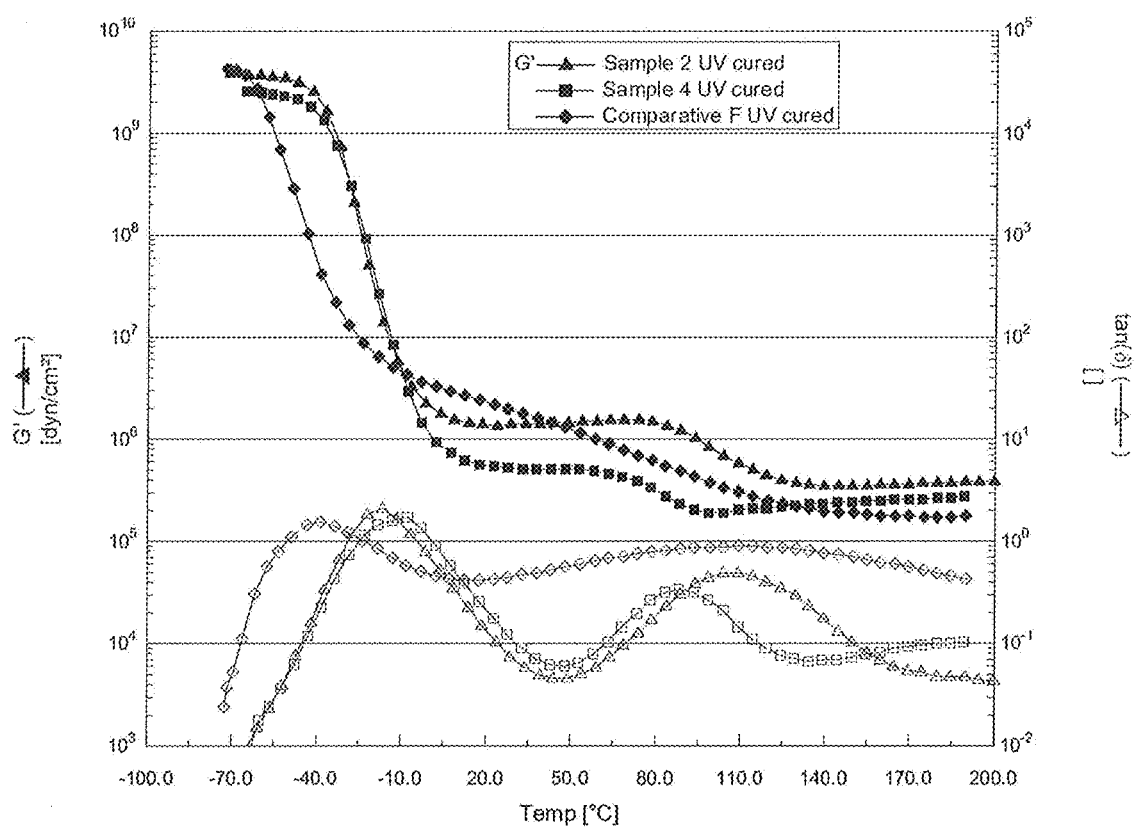
FIG. 3 shows RDA Temperature Sweep of Samples 2, 4, and F after UV cured.
Figure 4:
FIG. 4 shows a photograph of uncured films removal from a glass substrate.

Examples 1-4 and Comparative E-F are listed in Table 3. Comparative Examples E-F corresponds to adhesives described in WO 2013165637. All samples were prepared by mixing the components at 130° C. in a Glas-Col, as known to those of skill in the art. The properties of the examples are shown in Table 4. Samples 1-4 and E-F have viscosities that can be coated below 130° C. Sample 2 and 4 have flow temperatures at 80° C. and 68° C. respectively, as shown in Table 4 and FIG. 2, which are suitable for low lamination temperature for both organic photovoltaic module and LCD/LED display assembly processes. The UV cured adhesive films all showed significant increase of elastic modulus (G') at 25° C. and 100° C. after cure and over the uncured films at the same temperatures. The lack of a flow temperature for Samples 2, 4, and F after cure, as shown in FIG. 3, is indicative of formation of crosslinked network, which provides good creep resistance. Samples 1-4 also showed desirable peel strength, softness, and reworkability, where the film readily peeled off from the glass substrate before and/or after the UV cure. Comparative Examples E and F, however, have low elongation at break and low flow temperatures (25° C. and 43° C., respectively) prior to cure. These properties, in turn, result in poor roll storage due to edge oozing and poor reworkability during electronic device assembly due to poor strechability.

To test for reworkability, the adhesive film was first laminated on a glass slide and left on the slide for about 60 minutes, and then the adhesive was peeled off from the glass slide. The film was determined to have good reworkability if the adhesive film was removed as a single or as few pieces from the glass slide without breaking apart and without leaving much residue on the glass slide. As shown in FIG. 2, Sample 4, prior to cure, remained as a single piece and peel off of the glass slide without leaving any residue on the glass slide. Sample F, prior to cure, broke into multiple strands as the film was pulled away from the slide, and most of the film remained on the glass substrate.

TABLE 3

Adhesive Formulations

| Examples | 1 | 2 | 3 | 4 | Comparative E | Comparative F |
|---|---|---|---|---|---|---|
| SEPTON 4033 | 17 | 17 | 13 | 10 | | |
| White oil | 25 | 17 | 18 | 18 | | 9 |
| OPPANOL B15 | | | | | 39 | 72 |
| ESCOREZ 5380 | 41 | 50 | 51 | 54 | 42 | |
| CN308 | 17 | 17 | 17 | 17 | 18 | 18 |
| TPO | 1 | 1 | 1 | 1 | 1 | 1 |

TABLE 4

Adhesive Properties

| Examples | 1 | 2 | 3 | 4 | Comparative E | Comparative F |
|---|---|---|---|---|---|---|
| Viscosity, 120° C. (cps), before cure | 34500 | 43500 | | | 67500 | 291000 |
| Viscosity, 100° C. (cps), before cure | | | 102000 | 22950 | 124500 | |
| Hardness Shore OO, before cure | 30 | 40 | 25 | 20 | 45 | 50 |
| T %, 500-1100 nm, after cure | >97% | >97% | >97% | >97% | >97% | >97% |
| $n_D$, 22° C., after cure | 1.48 | 1.48 | 1.49 | 1.49 | 1.51 | 1.50 |
| DK, 1 Mhz, after cure | 2.5 | 2.5 | 2.5 | 2.5 | 2.3 | 2.3 |

TABLE 4-continued

Adhesive Properties

| Examples | 1 | 2 | 3 | 4 | Comparative E | Comparative F |
|---|---|---|---|---|---|---|
| Peel, oz/in, after cure | 9 | 20 | 19 | 18 | 87 | 79 |
| Ghosting, after cure | trace | trace | trace | trace | trace | trace |
| G', $10^5$ dyn/cm$^2$, 25° C. before cure | 3.7 | 4.0 | 2.8 | 1.2 | 3.8 | 6.4 |
| G", $10^5$ dyn/cm$^2$, 25° C. before cure | 0.3 | 0.4 | 0.4 | 0.4 | 3.8 | 4.6 |
| G', $10^5$ dyn/cm$^2$, 100° C. before cure | 0.07 | 0.04 | 0.004 | 0.001 | 0.04 | 0.2 |
| G", $10^5$ dyn/cm$^2$, 100° C. before cure | 0.3 | 0.3 | 0.05 | 0.006 | 0.2 | 0.7 |
| Tan Delta, 25° C., before cure | 0.08 | 0.1 | 0.1 | 0.2 | 1.0 | 0.7 |
| Flow temperature before cure (G" = G'), ° C. | | 80 | | 68 | 25 | 43 |
| Soft block Tg, ° C., before cure | −32 | −21 | −19 | −13 | −8 | −42 |
| G', $10^5$ dyn/cm$^2$, 25° C. after cure | 10.6 | 13.8 | 10.0 | 6.3 | 8.1 | 20.0 |
| G", $10^5$ dyn/cm$^2$, 25° C. after cure | 0.6 | 1.4 | 1.4 | 1.0 | 6.5 | 8.8 |
| G', $10^5$ dyn/cm$^2$, 100° C. after cure | 6.0 | 8.5 | 3.9 | 1.9 | 1.1 | 3.8 |
| G", $10^5$ dyn/cm$^2$, 100° C. after cure | 3.1 | 3.8 | 1.8 | 0.5 | 0.9 | 3.3 |
| Tan Delta, 25° C., after cure | 0.06 | 0.1 | 0.1 | 0.1 | 0.8 | 0.4 |
| Flow temperature after cure (G" = G'), ° C. | | none | | none | none | none |
| Soft block Tg, ° C., after cure | −30 | −16 | −17 | −7 | −8 | −37 |
| Shrinkage, %, during cure | <1 | <1 | <1 | <1 | <1 | <1 |
| Tensile Strength, psi, before cure | | 39.3 | | 17.9 | 14.4 | 20.7 |
| Elongation at break, %, before cure | | 1990 | | 2300 | 13 | 12 |
| removable before cure | good | good | good | ok | poor | poor |
| removable after cure | good | good | good | good | ok | ok |

We claim:

1. A pressure sensitive adhesive composition comprising:
   (A) about 0.5 to about 20 parts by weight of a styrenic block copolymer having fully hydrogenated and saturated soft blocks;
   (B) about 10 to about 60 parts by weight of a liquid diluent having a weight average molecular weight (Mw) less than 100,000 g/mol, a tackifier, or mixtures thereof;
   (C) about 10 to about 25 parts by weight of a (meth)acrylate monomer, an oligomer having at least two (meth)acrylic functionalities per oligomer chain or mixtures thereof; and
   (D) about 0.1 to about 5 parts by weight of a free radical initiator;
   wherein the styrenic block copolymer form a crosslinked network with the (meth)acrylate monomer or oligomer upon UV irradiation or heat,
   and wherein the total content of the pressure sensitive adhesive composition totals to 100 parts by weight.

2. The adhesive of claim 1, wherein the adhesive has a flow temperature (G'=G") of from about 45° C. to about 110° C. prior to cure and wherein the adhesive does not have a flow temperature after cure.

3. The adhesive of claim 1, wherein the adhesive has (a) a transmittance, measured in accordance with ASTM E903 at 500 nm, of greater than 90%, (b) a Shore OO value, measured in accordance with ASTM D2240, of about 10 to about 70, and (c) elongation at break, measured in accordance with ASTM D638, of greater than 200%.

4. The adhesive of claim 1 wherein the fully hydrogenated and saturated soft block of styrenic block copolymer is selected from the groups consisting of ethylene, propylene, butylene, isobutylene, ethylene-propylene, ethylene-butylene, and mixtures thereof.

5. The adhesive of claim 1 wherein the styrenic block copolymer is a triblock, a diblock, or mixtures thereof.

6. The adhesive of claim 1 wherein the liquid diluent is white oil or a wax.

7. The adhesive of claim 1 wherein the liquid diluent is polyisobutylene, polybutene, or a synthetic liquid polymer, having a weight average molecular less than about 100,000 g/mol.

8. The adhesive of claim 1 wherein the tackifier is a fully or partially hydrogenated soft block and/or hard block modifying tackifier selected from aliphatic resin, and/or aromatic resins.

9. The adhesive of claim 1 wherein the (meth)acrylic monomer is a multifunctional (meth)acrylate monomer, or mixtures thereof.

10. The adhesive of claim 1 wherein the (meth)acrylic oligomer is a (meth)acrylic functionalized polyisobutylene, polybutadiene, hydrogenated polybutadiene, and/or other polyolefin having greater than one reactive functional group per oligomer chain, wherein the reactive functional group is selected from the group consisting of terminal methacrylates, pendant methacrylates, terminal acrylates, and/or pendant acrylates; and mixtures thereof.

11. The adhesive of claim 1 wherein the free radical initiator is a photoinitiator or a thermal initiator.

12. The adhesive of claim 1 which is a film.

13. An article comprising the film of claim 12.

14. The article of claim 13 which is an electronic device.

15. The article of claim 14 wherein the electronic device is a LCD display, LED display, touch screen, or flexible thin film photovoltaic.

16. An electronic device comprising at least one optically clear, pressure sensitive adhesive film,
   wherein the pressure sensitive adhesive film comprises:
   (A) about 0.5 to about 20 parts by weight of a styrenic block copolymer having fully hydrogenated and saturated soft blocks; (B) about 10 to about 60 parts by weight of a liquid diluent, a tackifier, or mixtures thereof; (C) about 10 to about 25 parts by weight of a (meth)acrylate monomer, an oligomer having at least two (meth)acrylic functionalities per oligomer chain or mixtures thereof; and (D) about 0.1 to about 5 parts by weight of a free radical initiator;

wherein the styrenic block copolymer form a crosslinked network with the (meth)acrylate monomer or oligomer upon UV irradiation or heat;
  wherein the pressure sensitive adhesive film is removable before and/or after the UV or heat cure;
  wherein the adhesive has a flow temperature (G'=G") of from about 45° C. to about 110° C. prior to curing
  wherein the adhesive does not have a flow temperature after cure; and
  and wherein the total content of the pressure sensitive adhesive composition totals to 100 parts by weight.

\* \* \* \* \*

UNITED STATES PATENT AND TRADEMARK OFFICE
CERTIFICATE OF CORRECTION

PATENT NO. : 10,266,733 B2  
APPLICATION NO. : 15/426214  
DATED : April 23, 2019  
INVENTOR(S) : Yuxia Liu, Charles W. Paul and Peter D. Palasz Page 1 of 1

It is certified that error appears in the above-identified patent and that said Letters Patent is hereby corrected as shown below:

In the Specification

Column 5, Line 47: Change "(polystyrene-midblock)$_x$" to "(polystyrene-midblock)$_n$X".

Column 17, Line 40: Change "(GIGS)" to "(CIGS)".

Signed and Sealed this
Fourth Day of February, 2020

Andrei Iancu
*Director of the United States Patent and Trademark Office*